United States Patent
Kubota et al.

(10) Patent No.: US 6,779,389 B2
(45) Date of Patent: Aug. 24, 2004

(54) ROTATIONAL POSITION SENSOR, AND ELECTRICALLY OPERATED THROTTLE DEVICE AND ACCELERATOR POSITION SENSOR USING THE SAME

(75) Inventors: Masanori Kubota, Hitachinaka (JP); Hitoshi Andoh, Hitachinaka (JP); Kenji Ono, Mito (JP); Yasuo Saito, Hitachinaka (JP); Satoshi Yamazaki, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 41 days.

(21) Appl. No.: 10/255,704

(22) Filed: Sep. 27, 2002

(65) Prior Publication Data

US 2003/0110847 A1 Jun. 19, 2003

(30) Foreign Application Priority Data

Dec. 18, 2001 (JP) .......................................... 2001-384398

(51) Int. Cl.⁷ ............................................. G01M 15/00
(52) U.S. Cl. .................................................... 73/118.1
(58) Field of Search ............................... 73/116, 117.2, 73/117.3, 118.1, 118.2, 119 R

(56) References Cited

U.S. PATENT DOCUMENTS

| | | | | |
|---|---|---|---|---|
| 5,012,673 A | * | 5/1991 | Takano et al. ............. | 73/118.1 |
| 5,567,874 A | * | 10/1996 | Suzuki et al. ............. | 73/118.2 |
| 5,681,990 A | * | 10/1997 | Hampo et al. ............ | 73/118.2 |
| 6,018,992 A | * | 2/2000 | Kaijala ..................... | 73/118.1 |
| 6,032,521 A | * | 3/2000 | Miwa et al. ............... | 73/118.1 |
| 6,070,458 A | * | 6/2000 | Nawa et al. ............... | 73/118.2 |
| 6,418,908 B2 | * | 7/2002 | Wayama et al. ........... | 123/399 |
| 2003/0075149 A1 | * | 4/2003 | Hayashida ................. | 123/399 |
| 2004/0060542 A1 | * | 4/2004 | Wayama et al. ........... | 123/399 |

OTHER PUBLICATIONS

U.S. Published patent application No. 2002-0089324-A1 (Jul. 2002).

* cited by examiner

Primary Examiner—Eric S. McCall
(74) Attorney, Agent, or Firm—Crowell & Moring LLP

(57) ABSTRACT

Provided herein is a non-contact type rotational position sensor which is allowed to achieve intensification of parts, miniaturization, simplification of assembly, and higher accuracy. A rotor (a permanent magnet) is mounted on a rotational shaft. A Hall IC is interposed between an upper stator and a lower stator which are magnetic plates. The Hall IC is sensitive to magnetic flux density which varies according to a rotational position of the rotor. In a housing incorporating the rotor and the Hall IC is provided integrally a connector provided with an external connection terminal. Conductors for connecting external connection terminals and input/output terminals of the Hall IC are embedded into the housing by insert-molding. One ends of conductors are exposed at a fixed position where the input/output terminals are present. The terminals of the Hall IC are guided by a guide and joined to the one ends of conductors.

17 Claims, 20 Drawing Sheets

B-B

A-A

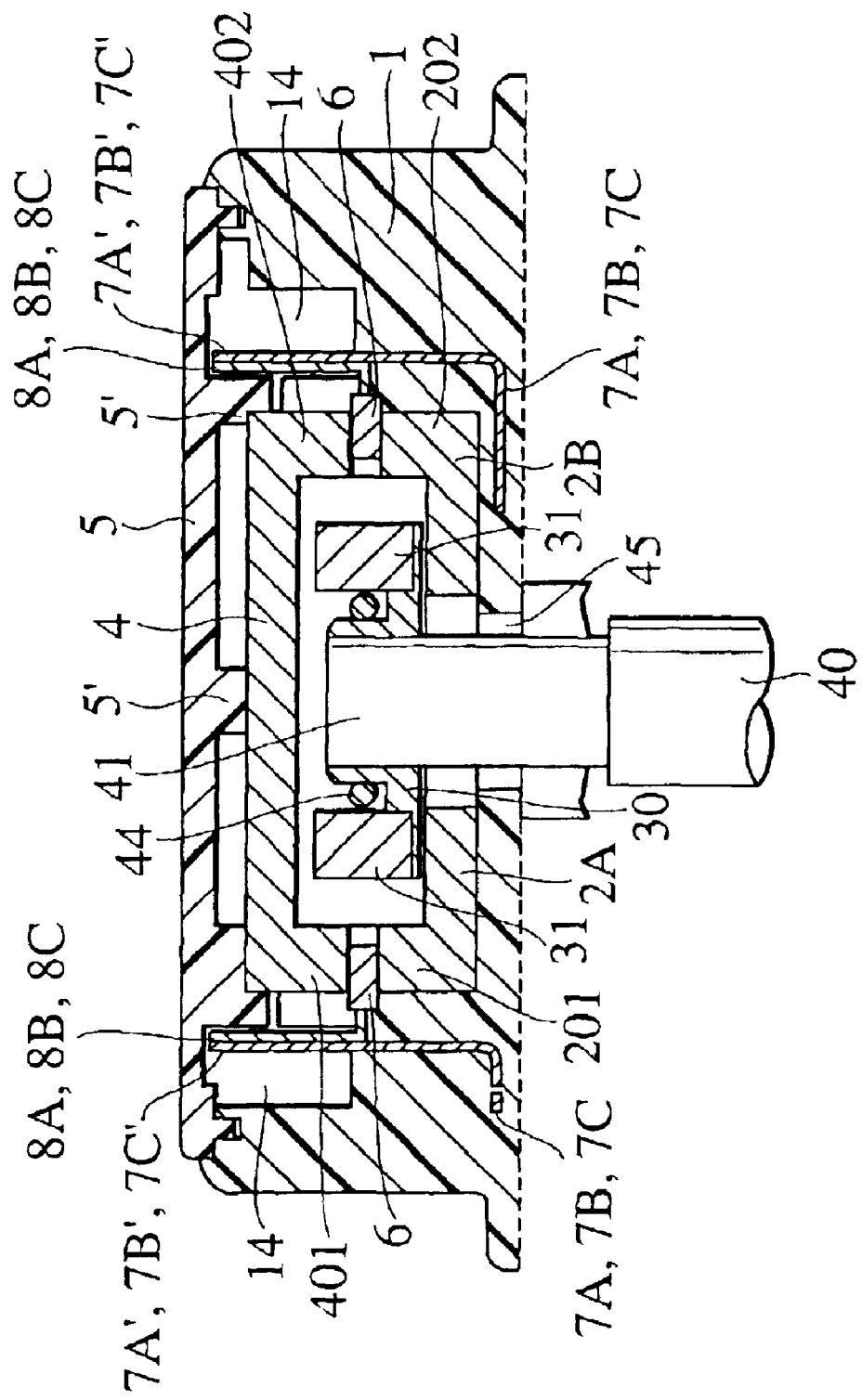

US 6,779,389 B2

ROTATIONAL POSITION SENSOR, AND ELECTRICALLY OPERATED THROTTLE DEVICE AND ACCELERATOR POSITION SENSOR USING THE SAME

BACKGROUND OF THE INVENTION

The present invention relates to a non-contact type rotational position sensor, for example, suitable for detecting a rotational position (an opening degree) of a throttle valve of the internal combustion engine, a press-down position of an accelerator pedal and the like.

As a non-contact type rotational position sensor in place of a sensor using a potentiometer (contact type), for example, a sensor for detecting a displacement of a rotational body by use of magnetic sensitivity has been known.

In the non-contact type sensor of this kind, a permanent magnet is mounted on a body to be detected (a rotational body), a magnetic sensitive element is arranged in the vicinity of the rotational body, and the magnetic flux amount which changes according to the displacement of the rotational body is detected by the magnetic sensitive element to detect a rotational position.

In Japanese Patent Laid-Open No. 8-68606, an IC chip in which a magnetic sensitive element or an amplification circuit is integrated is used for a rotational position sensor. Further, in Japanese Patent Application Laid-Open No. 2000-74613, a magnetic sensitive element (a Hall element), an amplification circuit and the like are constituted in the form of 2-chip IC.

SUMMARY OF THE INVENTION

It is an object of the present invention to provide a non-contact type rotational position sensor which is allowed to achieve intensification of parts, miniaturization, simplification of assembly, and higher accuracy.

Further, the present invention is to improve the following point.

With respect to the demand of the higher intensification of a non-contact type throttle sensor portion and of enhancing the mounting density of parts, an arrangement of a circuit element (for example, such as a capacitor, a Zener diode, etc.) for the protection from electric disturbance noises and surge and a maintenance of a space thereof fail to respond to the above demand sufficiently under present conditions. The present invention is intended to realize such demand.

The first invention comprises a rotor for a sensor mounted on a rotating body to be detected, and a sensitive element sensitive to physical energy generated from the rotor and changed according to a rotational position of the rotor. A rotational position of the body to be detected is detected from an output of the sensitive element.

There is a housing made of synthetic resin for incorporating the rotor and the sensitive element. The housing is integrally provided with a connector provided with external connection terminals for connecting with external apparatuses.

Conductors for connecting the external connection elements to input/output terminals of the sensitive element are embedded into the housing by insert-molding. One ends of said conductors are exposed onto the surface of the inner wall of the housing at a fixed position where the input/output terminals of the sensitive element are present.

On the other hand, the inner wall of said housing is formed with a guide for guiding the input/output terminals of the sensitive element to the fixed position. The input/output terminals of the sensitive element are guided by the guide are joined to the one ends of the conductors at the fixed opposition.

The second invention comprises a housing made of synthetic resin having an axial hole for guiding one end of a rotational shaft to a bottom wall, and holding a magnetic plate (a lower stator) arranged around the axial hole;

- a magnetic plate (an upper stator) mounted on the housing so as to oppose to the lower stator;
- a cover for holding the upper stator and covering the housing;
- a rotor having a magnet and mounted on one end of the rotational shaft and positioned between the upper stator and the lower stator; and
- a magnetic sensitive element arranged between a magnetic projecting portion provided on upper stator and a magnetic projecting portion provided on lower stator.

BRIEF DESCRIPTION OF THE DRAWINGS

Other objects and advantages of the invention will become apparent from the following description of embodiments with reference to the accompanying drawings in which:

FIG. 14 is a sectional view showing only the portion of the rotational position sensor out of FIG. 13;

DESCRIPTION OF THE PREFERRED EMBODIMENTS

Embodiments of the present invention will be described hereinafter with reference to the drawings.

Figure 1:
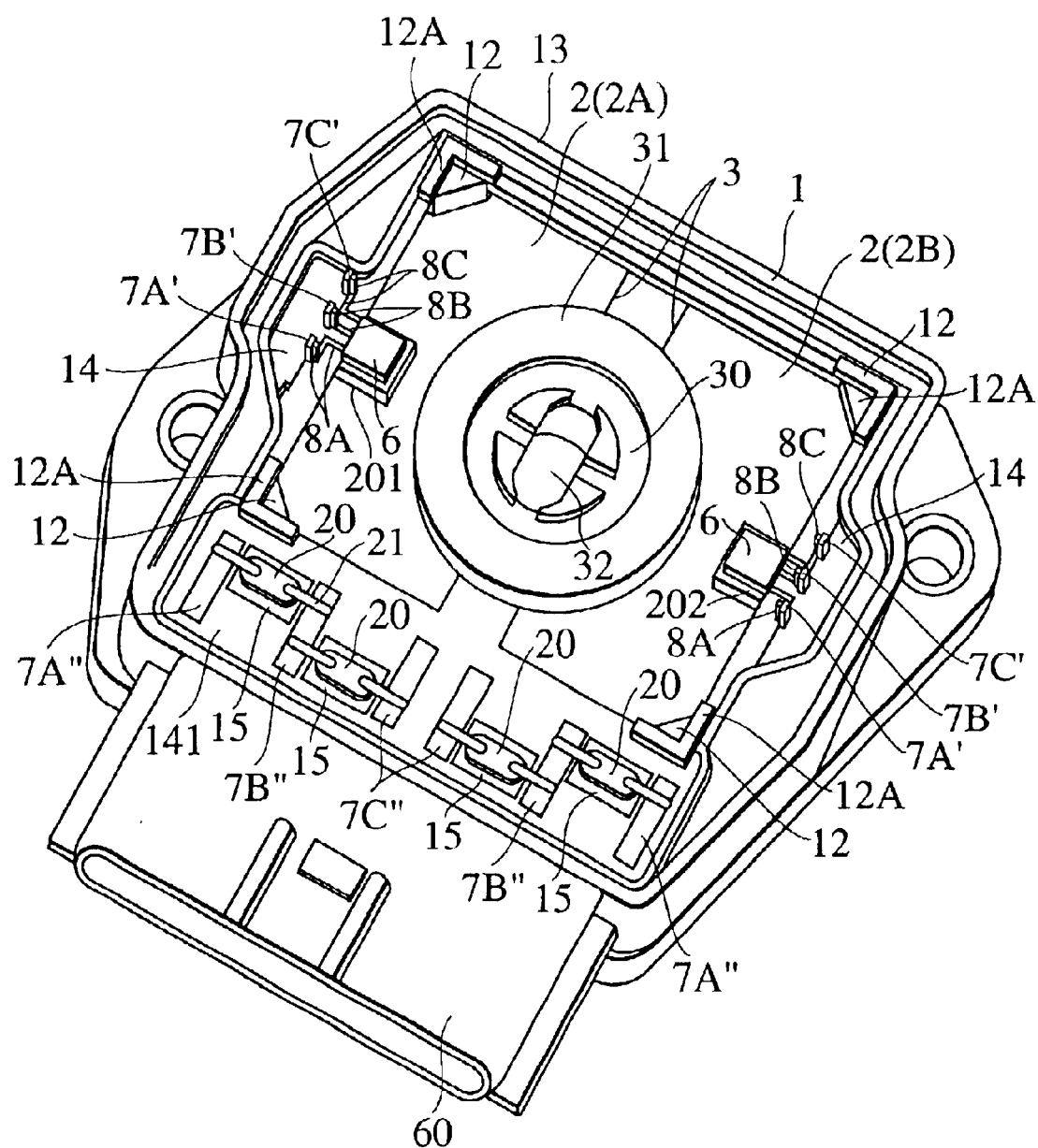
FIG. 1 is a perspective view of a non-contact type rotational position sensor according to a first embodiment of the present invention, showing the interior of a sensor housing with a cover and an upper stator removed.
Figure 2A:
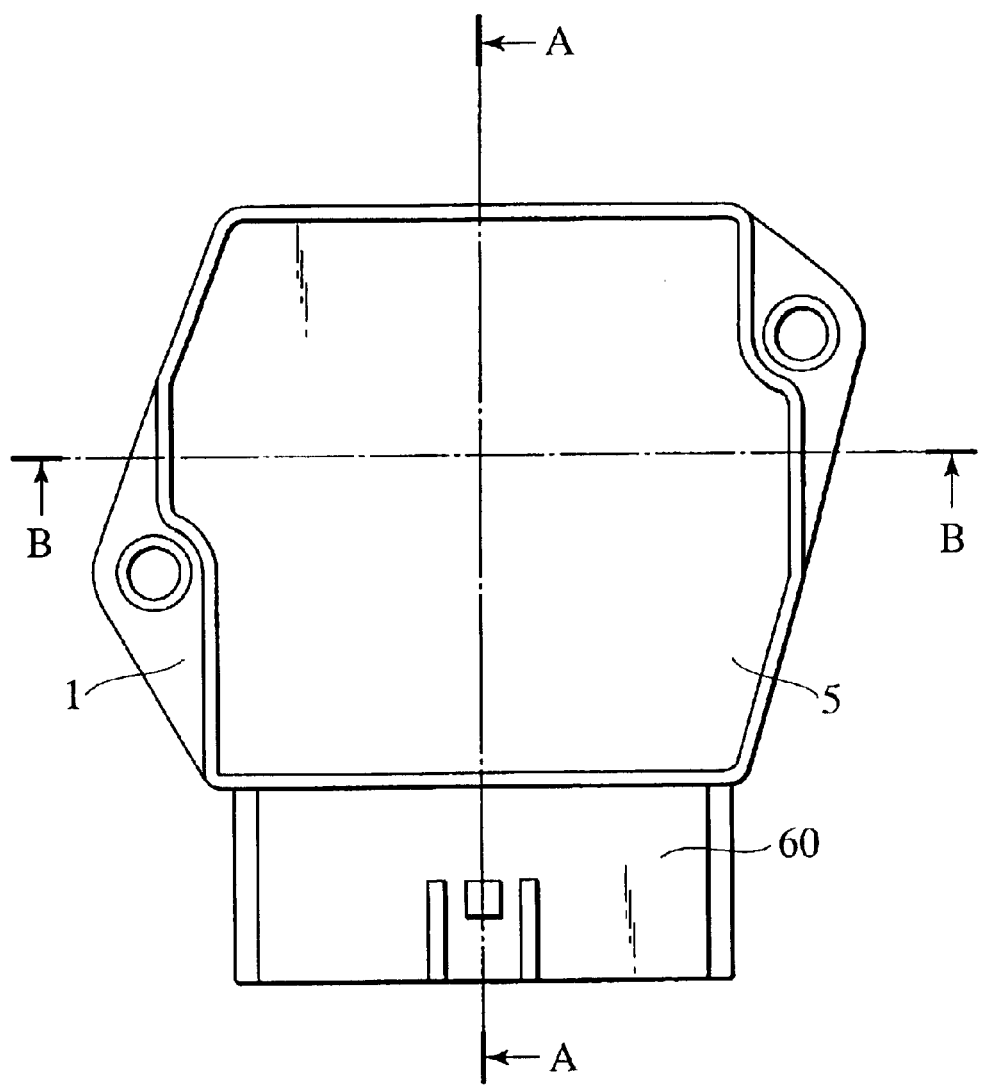
FIG. 2A is a top view of the rotational sensor in the above-described embodiment and FIG. 2B is a front view of a connector portion thereof.
Figure 2B:
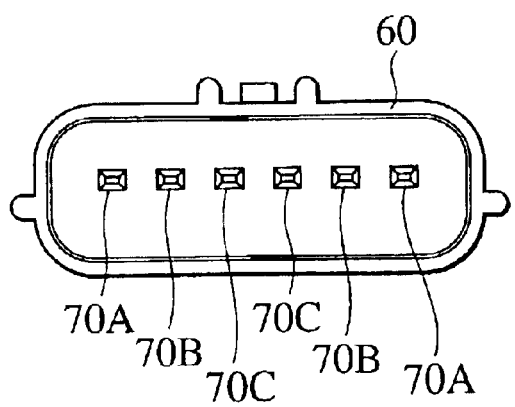
Figure 3:
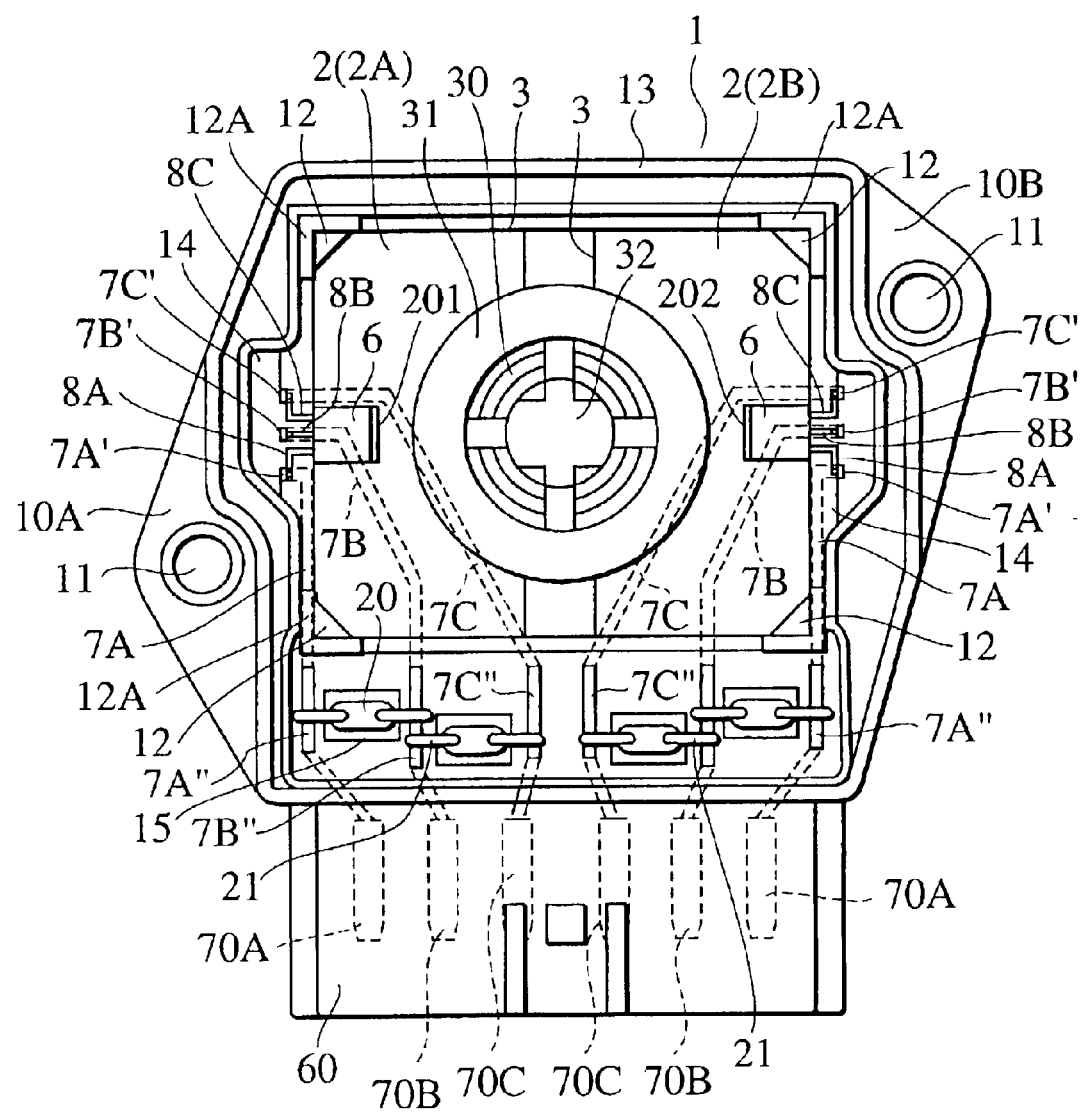
FIG. 3 is a top view of FIG. 1.
Figure 4:
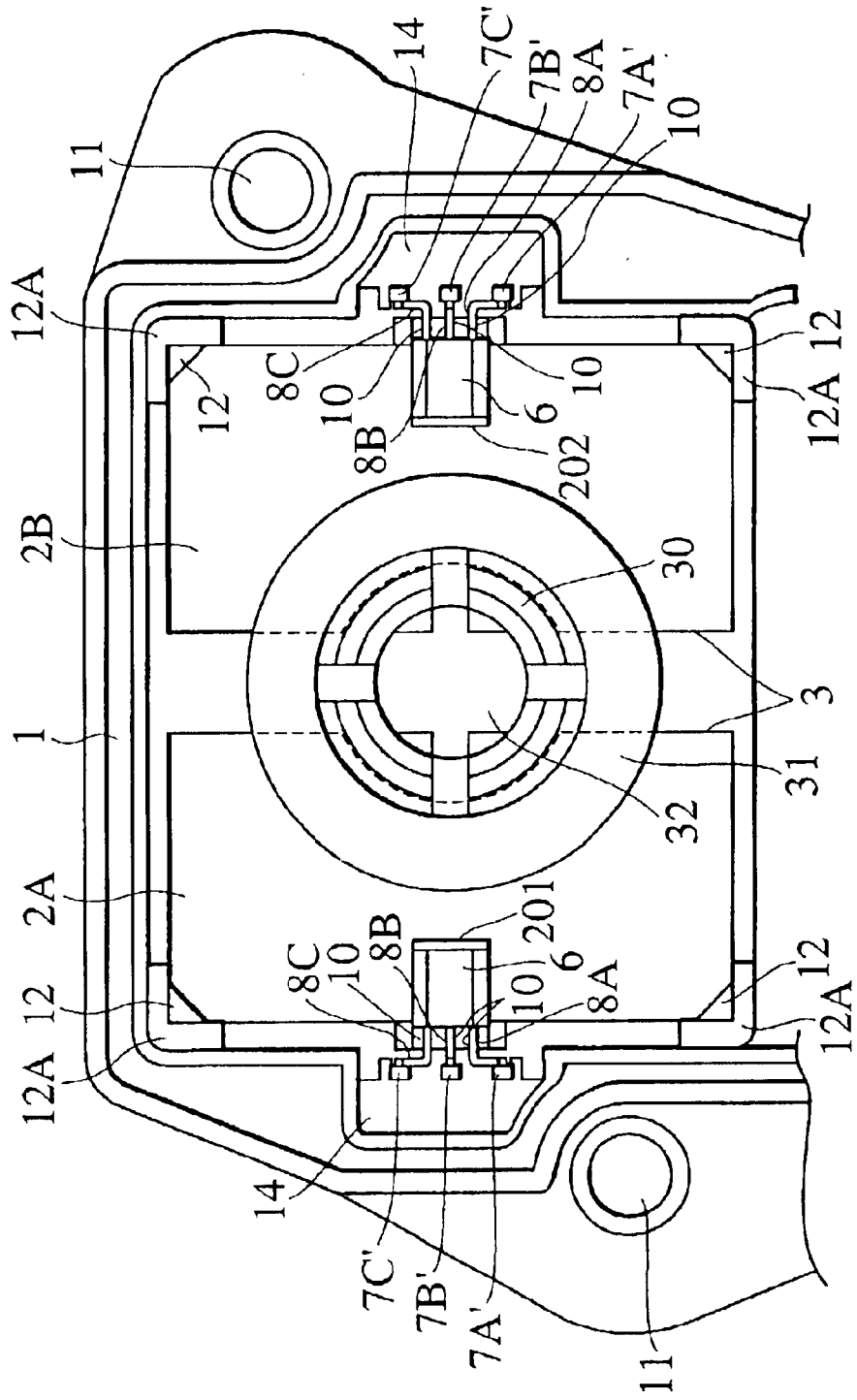
FIG. 4 is a partially enlarged view of FIG. 3.
Figure 5:
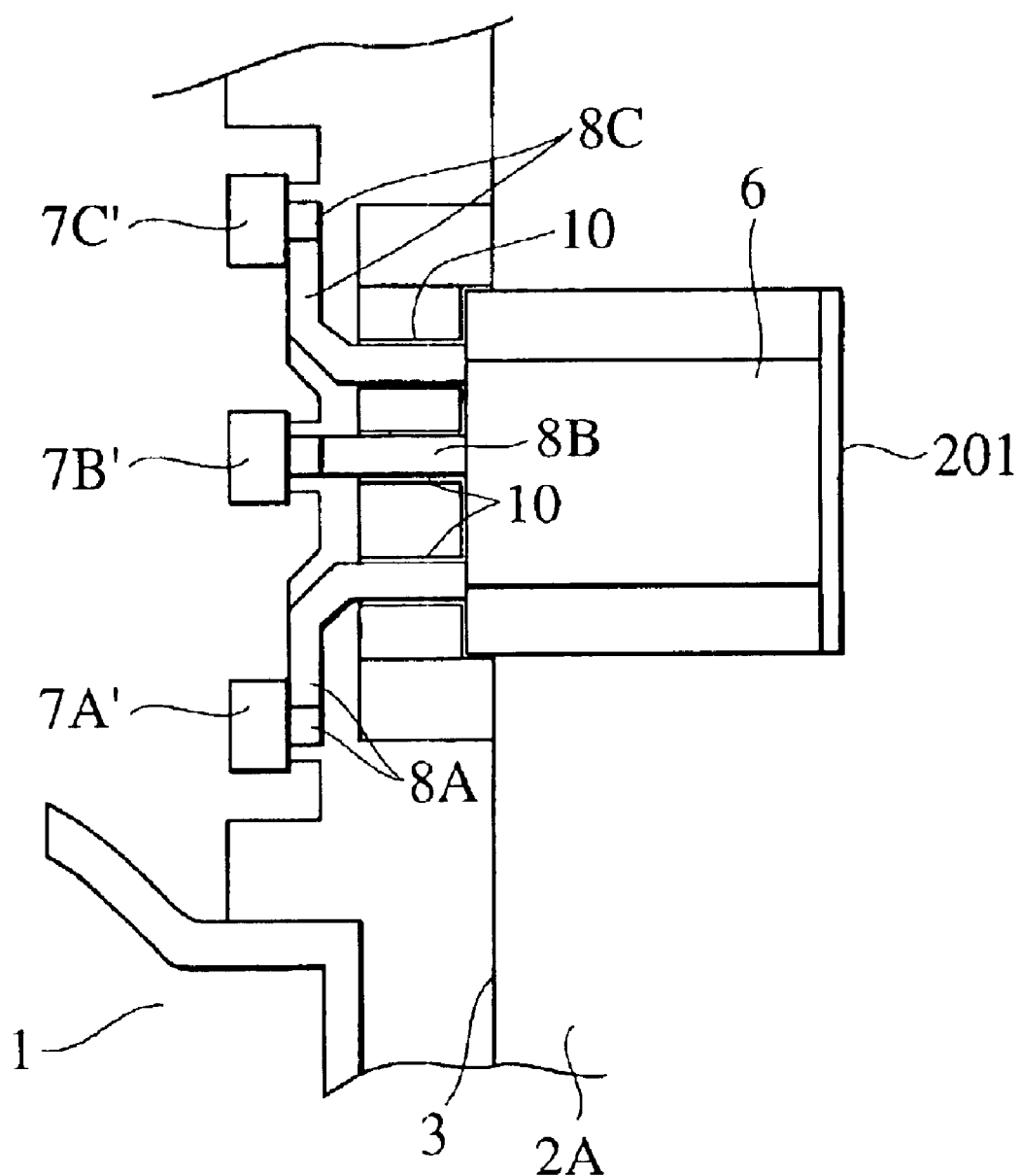
FIG. 5 is a partially enlarged view of FIG. 4.
Figure 6:
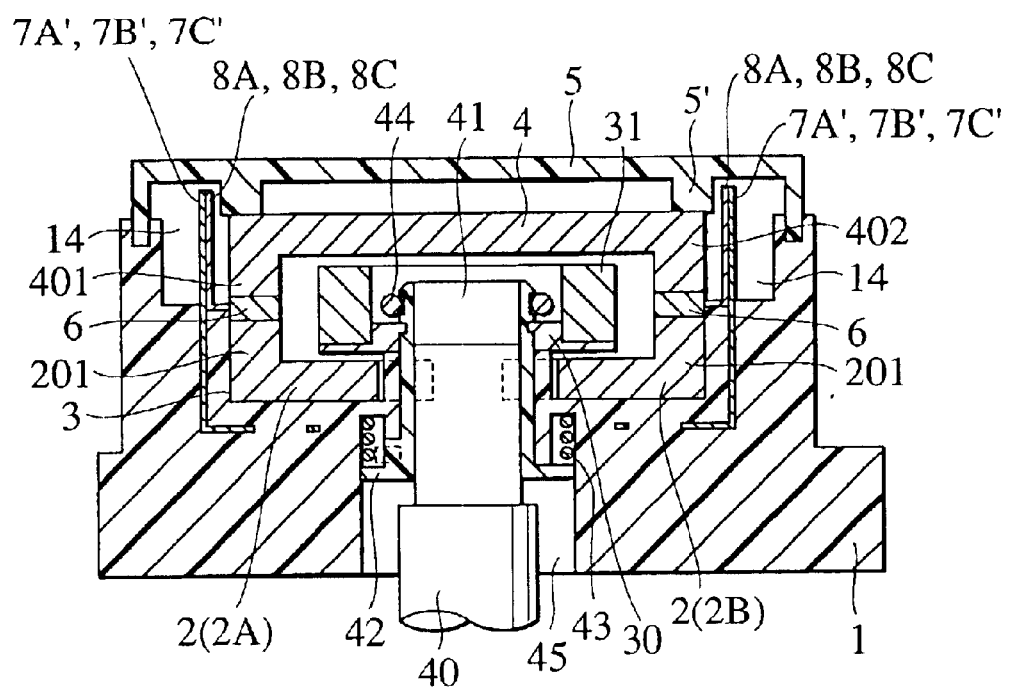
FIG. 6 is a sectional view taken on B—B of FIG. 2A.
Figure 7:
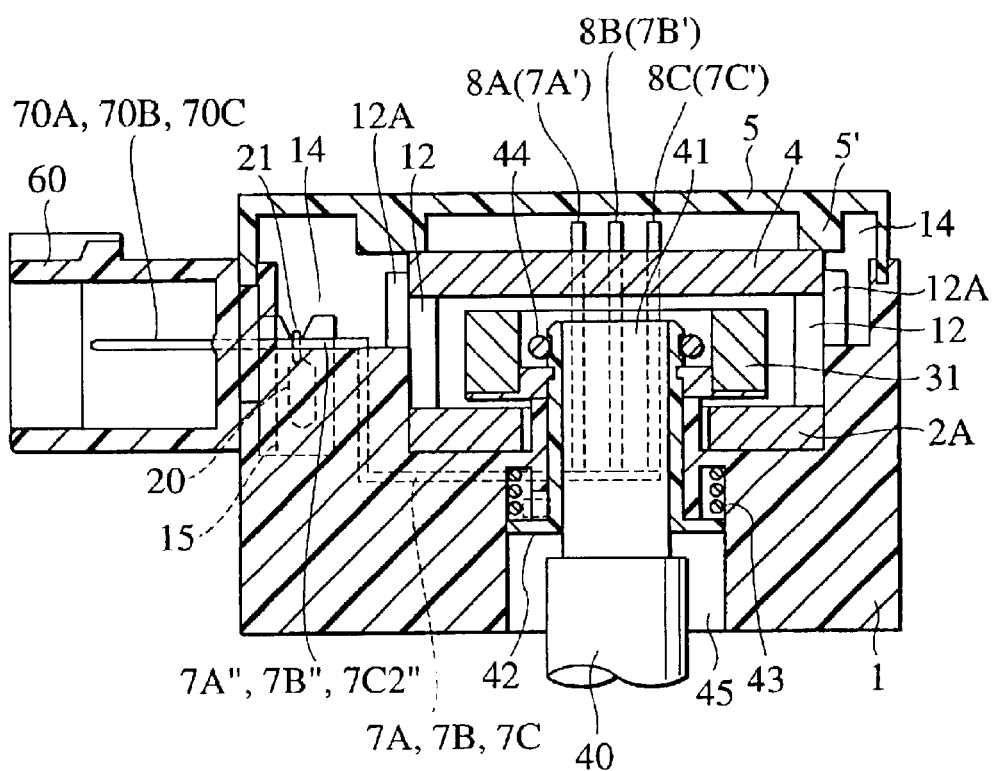
FIG. 7 is a sectional view taken on A—A of FIG. 2A.

FIG. 1 is a perspective view of a non-contact type rotational sensor according to a first embodiment of the present invention viewing the interior of a sensor housing with a cover and an upper stator removed, and FIG. 3 is a top view thereof. FIG. 2A is a top view of the rotational sensor and FIG. 2B is a front view of a connector portion thereof according to the present embodiment. FIG. 4 is a partial enlarged view of FIG. 3, and FIG. 5 is a partial enlarged view of FIG. 4. FIG. 6 is a sectional view taken on B—B of FIG. 2, and FIG. 7 is a sectional view taken on A—A of FIG. 2A.

A rotational position sensor according to the present embodiment is, as one example, a sensor (an accelerator position sensor) for detecting a pressing-down position of an accelerator pedal.

The non-contact type rotational sensor according to the present embodiment uses a magnetic sensitive element. Prior to describing the construction of the sensor referring the FIGS. 1 to 7, the principle construction thereof will be described referring to FIGS. 8 to 11.

Figure 9:
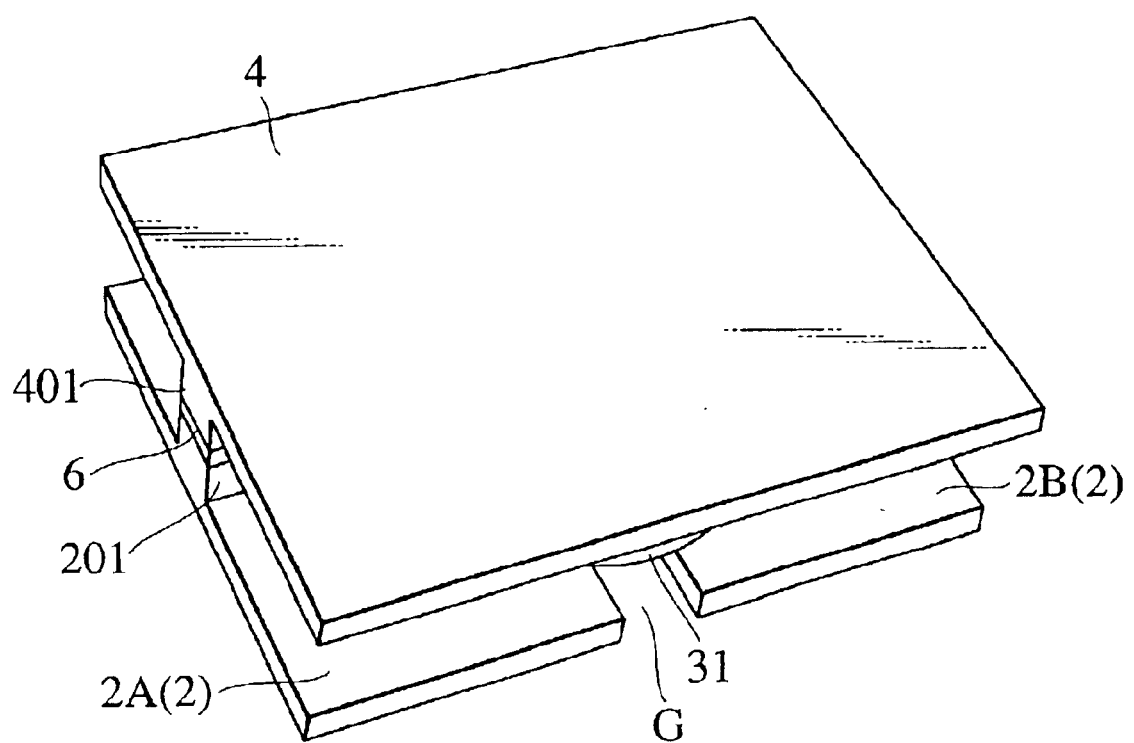
FIG. 9 is a perspective view showing the principle of a magnetic sensitive type rotational position sensor.
Figure 10:
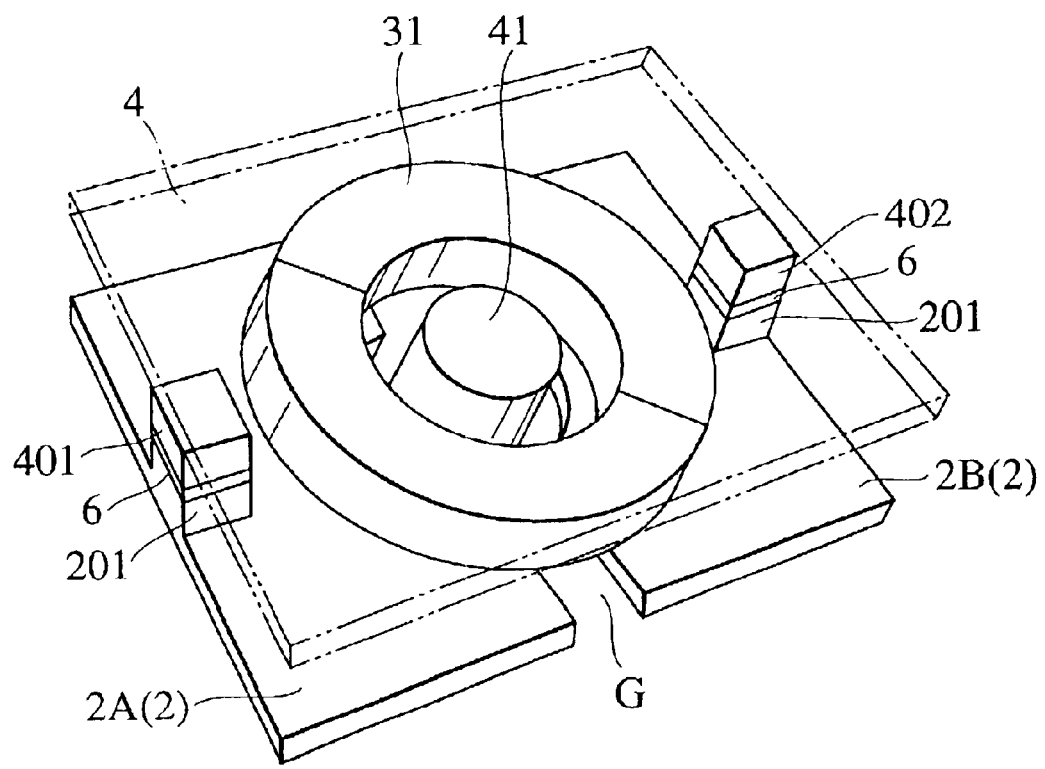
FIG. 10 is a through perspective view of FIG. 9.

FIG. 10 shows an arrangement of an upper stator 4, lower stators 2A, 2B, and a rotor 31, seeing through the upper stator 4. As shown in FIG. 10, a ring-like permanent magnet (a magnet) 31 is mounted at the extreme end of a rotational shaft 41 as a body to be detected to constitute a rotor. The rotor 31 is arranged between the magnetic plates (upper stator, lower stator) 4, 2 arranged vertically opposedly as shown in FIGS. 9 and 10. At least one out of the upper and lower stators is divided to left and right. In the present embodiment, the lower stator is divided into parts 2A and 2B to thereby secure a gap.

The upper stator 4 and the lower stators 2A, 2B have magnetic protrusions 401, 402, 201, 202 serving as magnetic flux converging portions (magnetic flux convergent portions). The magnetic protrusions 401 and 201 are disposed in such a manner as to oppose to each other with a uniform gap. The magnetic protrusions 402 and 202 are likewise arranged opposedly. There are two IC chips 6 having Hall elements (magnetic sensitive elements), which are inserted between the magnetic protrusions 401, 201 and between the magnetic protrusions 402, 202, respectively.

While in the present embodiment, the magnetic protrusions are molded integral with the upper stator and the lower stators, it is noted that those molded separately in advance may be joined by welding or the like. The magnetic protrusions are arranged at positions opposite to the outer circumference of the rotor 31 through an air gap.

The IC chip 6 is designed so that the Hall element and an amplification circuit are integrated and formed into a chip-like form. Even one IC chip 6 (a Hall element) performs a function, but two of them are used in order to enable mutual backing up at the time of trouble or checking a diagnosis of trouble.

Figure 11:
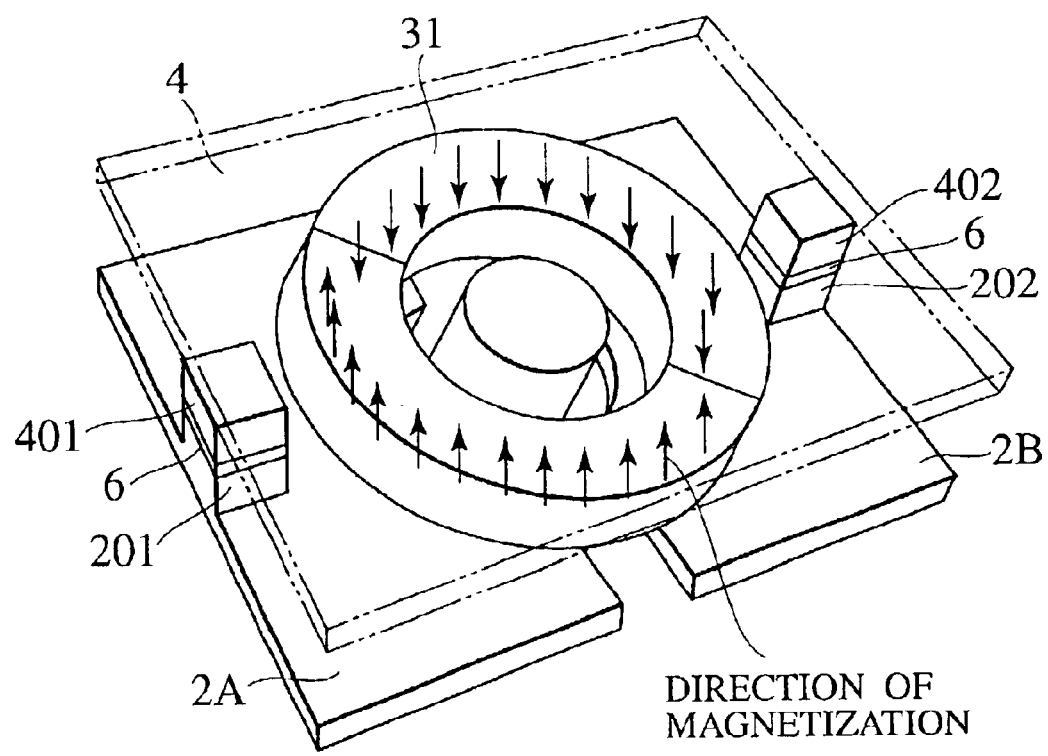
FIG. 11 is a through perspective view in which a magnetizing direction is added to FIG. 10.

The rotor 31 is magnetized generally in a vertical direction as shown by the arrow in FIG. 11. The direction of magnetization of the rotor 31 is upward in an area at 180 degrees of the rotational direction, and downward in an area at the remaining 180 degrees.

Figure 12:
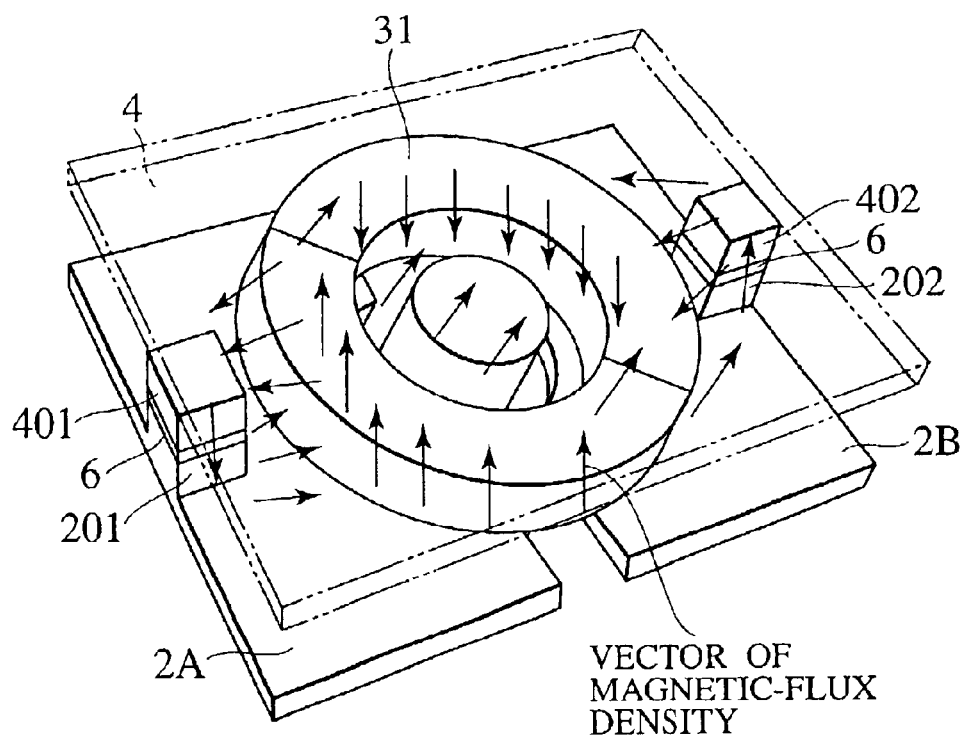
FIG. 12 is a through perspective view in which a vector of magnetic flux density is added to FIG. 10.

The vector of magnetic flux at that time has a distribution as shown by the arrow in FIG. 12. That is, the magnetic field caused by the rotor 31 forms a magnetic path passing the upper and lower stators 401, 402, and the magnetic flux converged by the magnetic protrusions 401, 201, and the magnetic protrusions 402, 202 passes through the IC chip 6. The amount of magnetic flux passing through the IC chip 6 varies according to the rotational position of the rotor 31. A signal corresponding to the variation of the amount of magnetic flux is output form the IC chip 6 to enable detection of the rotational position.

The constitution of circuit of the rotational position sensor will be described with reference to FIG. 8.

Figure 8:
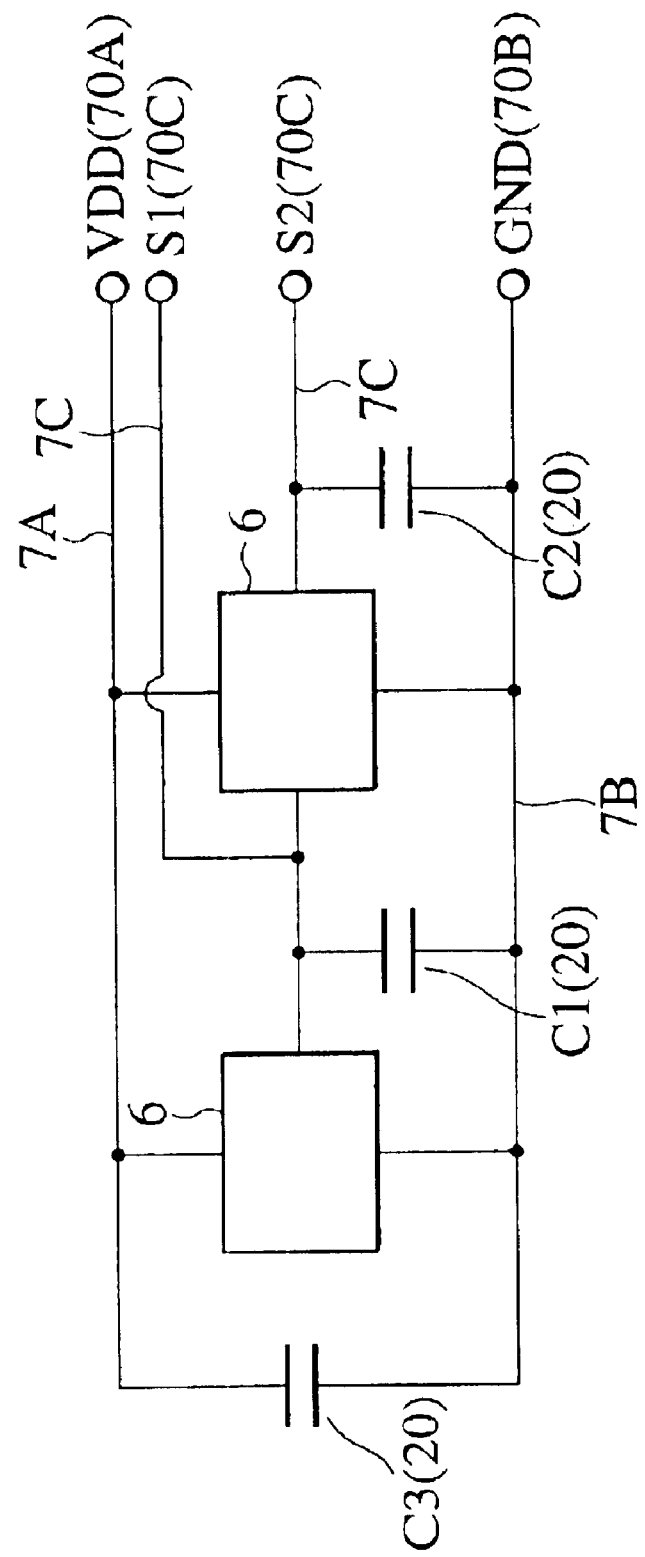
FIG. 8 is a circuit constitutional view of the above-described embodiment.

FIG. 8 shows an example of circuit constitution where two IC chips (hereinafter called Hall IC) 6 are used. The Hall IC 6 is connected between a power supply VDD and a ground GND, and output of one Hall IC 6 is removed from an output terminal S1 whereas output of the other Hall IC 6 is removed from an output terminal S2.

In case of the present embodiment, a capacitor C3, a capacitor C1, and a capacitor C2 are connected between the power supply VDD and the ground GND, between the output terminal S1 and the ground GND, and between the output terminal S2 and the GND, respectively.

The capacitor C3 is used for protecting electric disturbance noises or surge, and the C1 and C2 operates, in addition to the protection of electric disturbance noises or surge, as a filter for internal noises of the Hall IC. It is noted that the capacitors C1, C2 and C3 may be a single according to the necessity, or may be used together with a Zener diode element or a resistance element (not shown).

The fundamental principle of the rotational position sensor is as described above. Next, the mounting construction of the rotational position sensor according to the present embodiment will be described with reference to FIGS. 1 to 7.

A housing 1 of the rotational position sensor is made of synthetic resin molded into a substantially square, and is molded integral with a connector 60 provided with two sets of external connection terminals 70A, 70B, 70C for electrical connection to external apparatuses.

The connector 60 is formed on one side of the housing 1, into which the external connection terminals 70A, 70B, 70C are insert-molded. The external connection terminal 70A corresponds to the power supply terminal VDD shown in FIG. 8, the external connection terminal 70B corresponds to the ground terminal GND, and the external connection terminal 70C corresponds to signal output terminals S1, S2. Two sets of the external connection terminals 70A to 70C are arranged in lateral one row. To simplify the connection of capacitors (C1, C2, C3) 20 described later, the external connection terminal (GND terminal) 70B is arranged between the external connection terminal (power supply terminal VDD) 70A and the external connection terminal (signal output terminals S1, S2) 70C.

The housing 1 has an axial hole 45 for guiding one end 41 of a rotational shaft 40 to the bottom wall, as shown in FIGS.

6 and 7. The housing 1 is formed in its inner bottom with two recesses 3 divided to left and right in order to house the lower stators 2A, 2B around the axial hole 45. The lower stators 2A, 2B are mounted to each recess 3 by adhesion. The housing 1 holds the lower stators 2A, 2B by adhesion, but the lower stators 2A, 2B may be held on the housing 1 by insert-molding in place of adhesion.

A spacer 12, which provides a function for relative registration between the upper stator 4 and the lower stators 2A, 2B and a function for maintaining a spacing between both the stators, is molded integral with the housing 1.

The spacer 12 is formed so as to cover four corners of the lower stators 2A, 2B, and an L-shaped convex portion 12A for receiving a corner of the upper stator 4 is formed on the upper surface of the spacer.

Two sets of conductors 7A, 7B, 7C for connecting the external connection terminals 70A, 70B, 70C to input/output terminals 8A, 8B, 8C of the Hall IC 6 are embedded into the housing 1 by insert-molding, as shown in FIG. 3. One ends 7A', 7B', 7C' of these conductors 7A, 7B, 7C are exposed onto the surface of the inner wall of the housing at a fixed position where the input/output terminals 8A, 8B, 8C of the Hall IC 6 are present. The one ends 7A', 7B', 7C' of these conductors 7A, 7B, 7C are bended and molded so as to project onto the surface of the inner wall of the housing.

The conductor 7A, the conductor 7B and the conductor 7C are wired as a power supply line, a ground line, and an output line of the Hall IC, respectively.

A space 14 for joining the one ends 7A', 7B', 7C' of the conductors 7A, 7B, 7C to one ends 8A, 8B, 8C of the input/output terminals of the Hall IC 6 is formed along one side of each lower stator housing space 3 in the inner surface of the housing 1. In the present embodiment, since two sets of Hall ICs 6 are used, two spaces 14 are also secured. Further, parts 7A", 7B", 7C" of the conductors 7A, 7B, 7C are also exposed to one side intersected at right angles to side where the space 14 is present, and a recess (a hole) 15 for housing a circuit element 20 is disposed between these conductor-exposed portions. For example, capacitors 20 corresponding to C1, C2, C3 shown in FIG. 5 are inserted into the recess 15 (or may be a Zener diode, or a circuit element which is at least one kind of resister), and a terminal 21 of this capacitor is connected between the conductor-exposed portions 7A" to 7B".

The surfaces of the conductor-exposed portions 7A", 7B", 7C", the circuit element housing space 15, and the Hall IC terminal connection space 14 are formed to be lower than an outer frame 13 of the housing 1.

A groove-like guide 10 for guiding the input/output terminals 8A, 8B, 8C of the Hall IC 6 to terminal joining portions with the one ends 7A', 7B', 7C' of the conductors is provided in the peripheral inner wall of the place where the lower stators of the housing 1 are installed, as shown in FIGS. 4 and 5. The input/output terminals 8A, 8B, 8C are fitted in the guide 10 and thereby guided. The guide 10 also has a function to position the IC chip 6.

The input/output terminals 8A, 8B, 8C of the Hall IC 6 are joined to the one ends 7A', 7B', 7C' of the conductors by welding. The terminals 8A, 8B, 8C are vertically bended and molded so that the ends thereof are united with the one ends 7A', 7B', 7C' of the conductors.

As shown in FIGS. 6 and 7, a magnet holder 30 is mounted through a collar 42 on one end 41 of the rotational shaft 40. The magnet holder 30 holds an annular permanent magnet (a rotor) 31. Reference numeral 32 denotes an axial hole provided in the collar 42. The returning force is urged against the rotational shaft 40 by means of a return spring 43. Numeral 44 denotes a C ring.

The upper stator 4 is made to adhere through a protrusion 5' provided internally of the cover 5 whereby the former is held on the cover 5. Four corners of the upper stator 4 are located and held on the upper surface of the spacer 12 as shown in FIGS. 4 and 7, and the cover 5 is covered over an upper Opening of the housing 1. The upper stator 4 is located with respect to the lower stators 2A, 2B by the spacer 12. In the spacer 12, a uniform gap is held between the upper stator and the lower stators. Further, the Hall IC 6 is positioned between the magnetic protrusions 401, 201, and between the magnetic protrusions 402, 202.

According to the present embodiment, since a wire harness within the housing 1 of the non-contact type rotational position sensor is almost subjected to insert-molding, the interior of the housing is not complicated by wiring to enable an assembly of parts or an electric connection work of a circuit element.

Further, also the Hall IC 6 for which locating accuracy is required can be simply located merely by fitting the terminals 8A to 8C into the guide groove 10, and further, registration of position between the terminals 8A to 8C and the conductors 7A to 7C can be also carried out easily.

Relative locating between the upper stator 4 and the lower stators 2A, 2B and uniform gap holding therebetween can be carried out simply and with good accuracy by the spacer 12 with the L-shaped protrusion 12A provided on the housing 1.

The electric disturbance noises or surge relative to the Hall IC can be protected by the relatively simple constitution. Further, since the capacitors or the Zener diode of the circuit element for protecting the electric disturbance noises or surge are not encased in a highly integrated IC, the IC chip is prevented from being large-scaled. Further, since the circuit element such as the capacitor 20 can be connected between the conductor-exposed portions 7A", 7B", 7C" in the state of being inserted into the recess 15, the space for the circuit element within the housing 1 can be rationalized, and so the mounting density of the circuit element can be raised.

Accordingly, it is possible to realize a non-contact type rotational position sensor which is allowed to achieve intensification of parts, miniaturization, simplification of assembly, and higher accuracy.

Further, the upper and lower stators 4, 2A, 2B are held before assembling into the cover 5 and the housing 1, and the cover is mounted on the housing whereby the relative locating between the upper and lower stators is done naturally. Since the magnetic protrusions and the Hall IC are also arranged vertically while being adjusted to the stators, further miniaturization of the sensor, simplification of assembly, and higher accuracy, and intensification of parts can be achieved.

Next, a second embodiment of the present invention will be described with reference to FIGS. 13 to 16. In the present embodiment, the rotational position sensor according to the present invention is mounted as a throttle position sensor on a motor-driven type throttle device (a throttle valve device) in the internal combustion engine.

Figure 13:
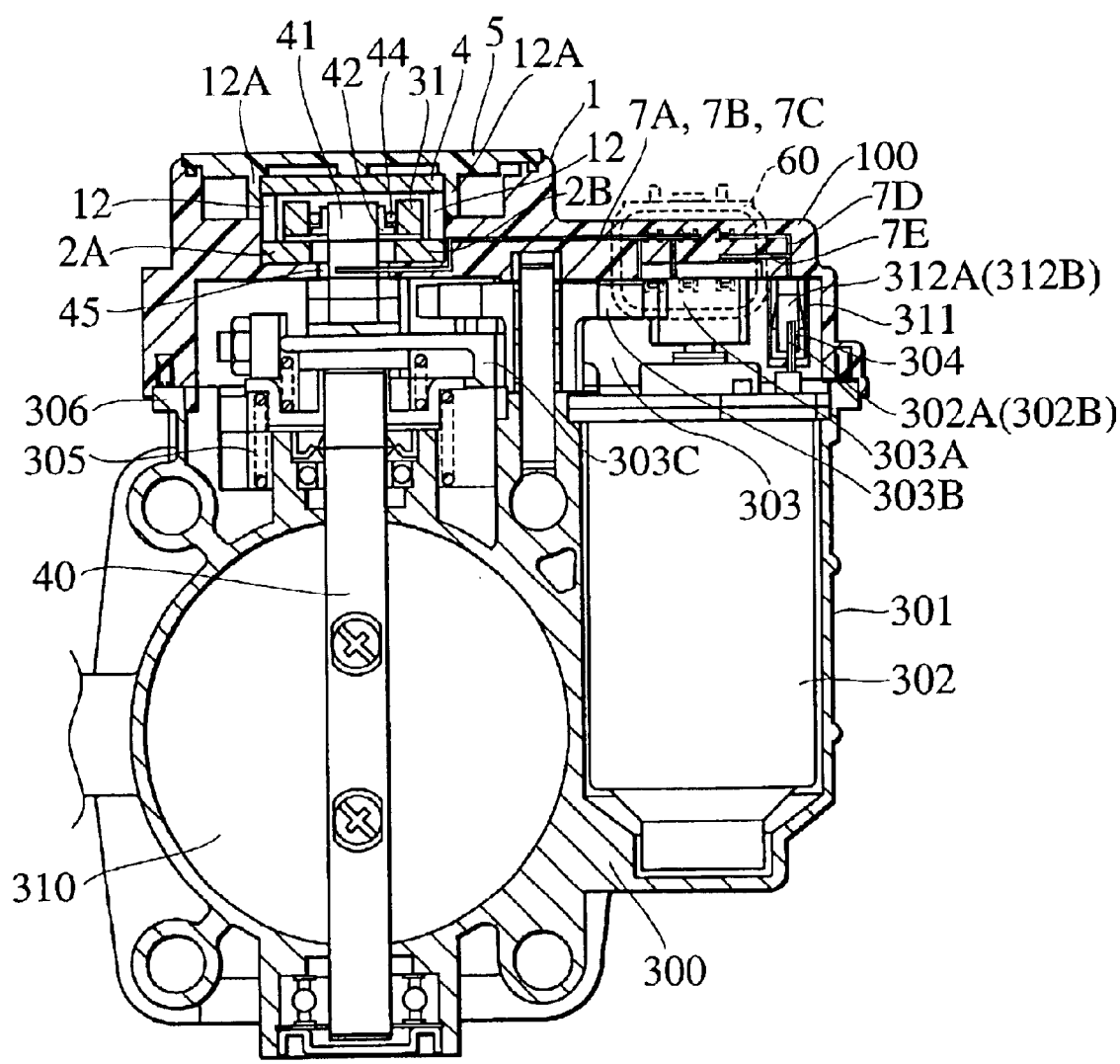
FIG. 13 is a longitudinal sectional view showing the state where a rotational position sensor (a throttle opposition sensor) according to a second embodiment of the present invention is mounted on the throttle body for controlling air flow rate of the engine (A sectional view taken on C—C of FIG. 16)
Figure 15A:
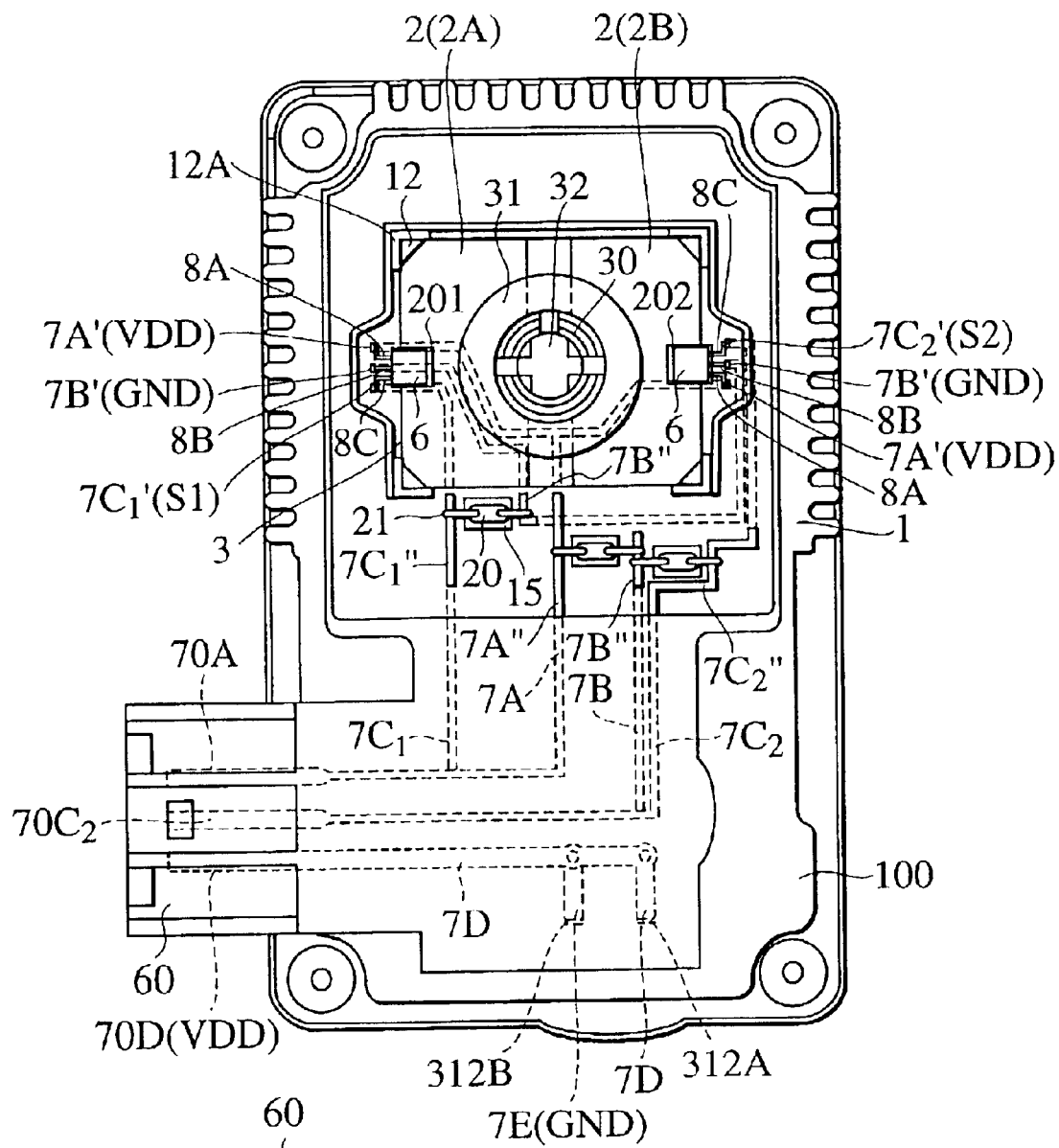
FIG. 15A is a top view showing the internal construction of a housing with a cover and a lower stator removed from the rotational position sensor shown in FIG. 16
Figure 15B:
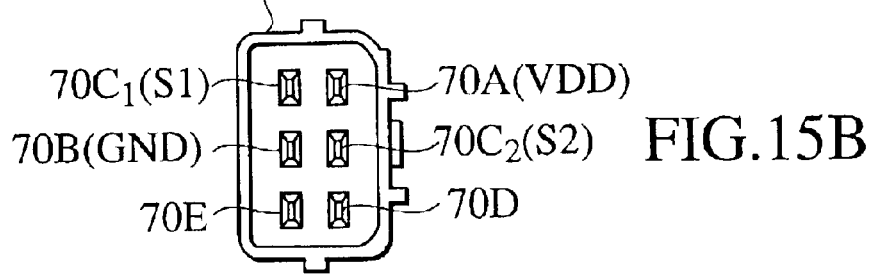
FIG. 15B is a front view of a connector portion thereof.
Figure 16:
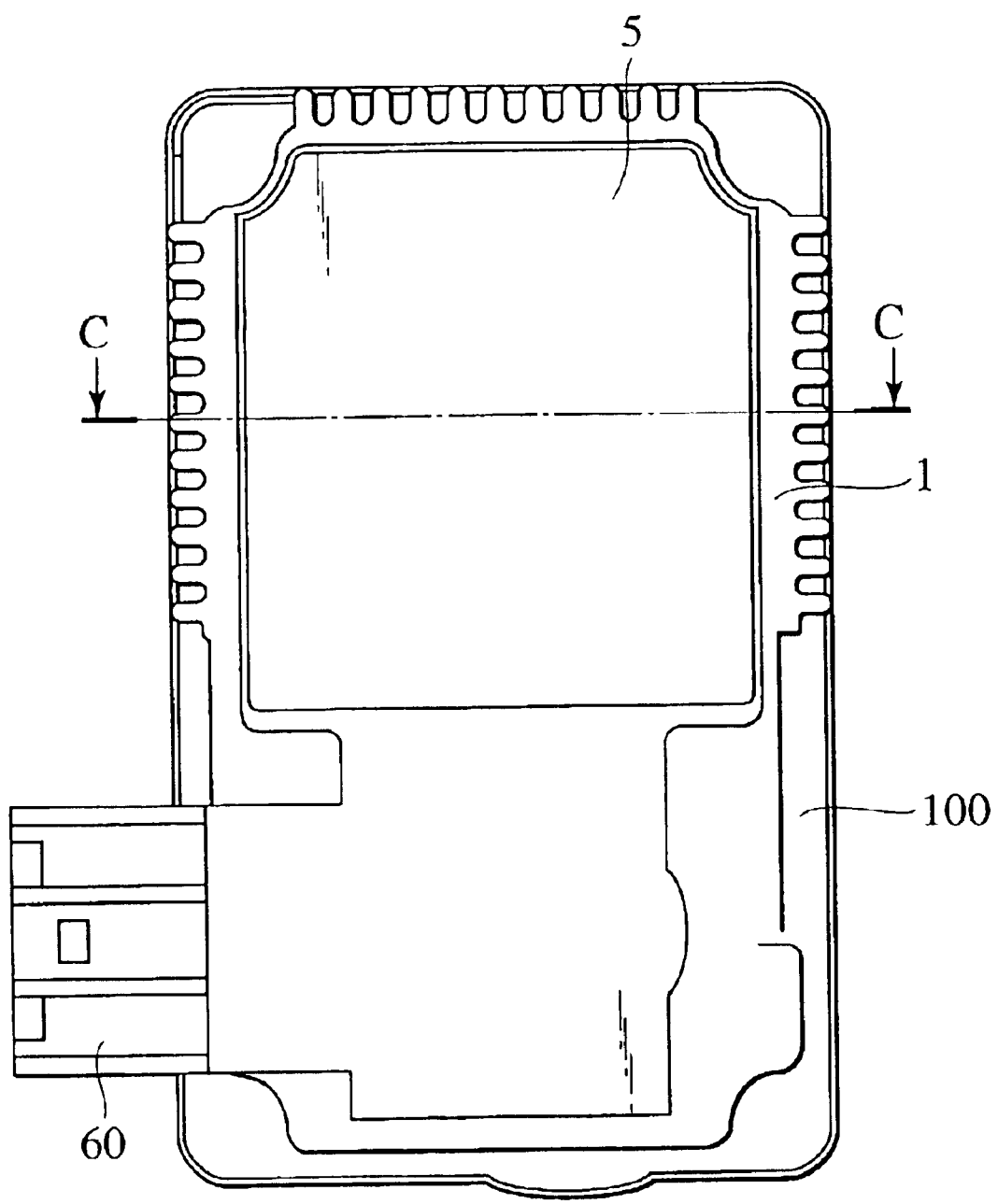
FIG. 16 is a plan view showing the state where the rotational position sensor of the second embodiment is provided.

FIG. 13 is a longitudinal sectional view (a sectional view taken on C—C of FIG. 16) showing the state where the non-contact type rotational position sensor (a throttle position sensor) according to the present embodiment is mounted on a throttle body 300 for controlling air flow rate of the engine, FIG. 14 is a sectional view showing only the portion of the rotational position sensor, FIG. 15A is a top view showing the internal construction of a housing with the cover 5 and the lower stator 4 removed from the rotational position sensor shown in FIG. 16, FIG. 15B is a front view of the connector portions, and FIG. 16 is a plan view showing the state where the rotational position sensor is provided on a gear cover 100 mounted on the throttle body 300. In the figures, the same reference numerals as those of the first embodiment show the same or common elements.

The basic construction of the rotational position sensor (a throttle position sensor) according to the present embodiment is similar to that of the first embodiment.

The different point is that in the housing 1 of the rotational position sensor according to the present embodiment, first, a sensor housing 1 is formed on a cover (a gear cover) 100 of a gear mechanism 303 to be mounted on the throttle body 300.

In the throttle body 300, a motor housing 301 which houses a motor 302 for driving a throttle shaft 400, and a gear housing 306 for housing a gear mechanism 303 and a default mechanism are molded integrally. The cover 100 covers the gear housing 306, and the sensor housing is formed on the cover 100.

A terminal 302A of the motor 302 and a ground terminal 302B thereof are connected to intermediate terminals 312A, 312B provided on the cover 100 through connection fittings 311.

Power of the motor 302 is transmitted to a throttle shaft 40 through the gear mechanism 303 (a pinion 303A, an intermediate gear 303B, a final gear 303C) to drive a throttle valve 310.

The holding mechanism of the lower stators 2A, 2B housed internally of the sensor housing 1 and the layout thereof, the arrangement of the Hall IC 6, the drawing construction (guide construction) of the input/output terminals 8A, 8B, 8C and the joining modes between the input/output terminals 8A, 8B, 8C and the conductors 7A, 7B, 7C are similar to those of the first embodiment. Further, the modes for holding the upper stator 4 by the cover 5 is also similar to the first embodiment.

The second point different from the first embodiment is an arrangement of a connector 60 and an external connection terminals 70A to 70C thereof, and a wiring pattern of the conductors 7A to 7C.

The connector 60 is integrally molded on the side of the gear cover 100, and the connector 60 is arranged at a position away from the sensor housing 1.

The external connection terminals subjected to insert-molding on the connector 60 include, as shown in FIGS. 15A and 15B, terminals 70A, 70B, 70C$_1$, 70C$_2$, and motor terminals 70D, 70E for throttle driving. In the present embodiment, the power supply VDD (external connection terminal 70A) of two Hall ICs 6 and the GND terminal (external connection terminal 70B) are used in common. In the plan view of FIG. 15A, the external connection terminal 70B is behind the 70C$_2$ and not shown, the external connection terminal 70C$_1$ is behind the 70A and not shown, and the external connection terminal 70E is behind the 70D and not shown.

That is, as shown in FIG. 15B, the external connection terminals in connection with the rotational position sensor (a throttle position sensor) are four in total including one power supply terminal VDD (70A), and one ground terminal GND (70B), and two sensor input/output terminals S1, S2 (70C$_1$, 70C$_2$). Further, the external connection terminals are 6 in sum total if a power supply terminal 70D for a motor and a ground terminal 70E thereof are added to those for the rotational position sensor, and these terminals are arranged in 3× two rows.

The conductor 7A corresponding to the power supply terminal VDD (external connection terminal 70A), the conductor 7B corresponding to the ground terminal (external connection terminal 70B), the conductors 7C$_1$, 7C$_2$ corresponding to the sensor output terminals S1, S2 (external connection terminals 70C$_1$, 70C$_2$), and the conductors 7D, 7E corresponding to the motor terminals 70D, 70E are embedded in the gear cover 100 by insert-molding.

Out of the conductors 7A, 7B, 7C$_1$, 7C$_2$, the conductor 7A for power supply is divided into two in the midst and each one end 7A' is drawn out to the joining portion with the power supply terminal 8A of each Hall IC 6. The conductor 7B for ground is also divided into two in the midst, and each one end 7B' is drawn out to the joining portion with the power supply terminal 8B of each Hall IC 6.

Parts 7A", 7B", 7C$_1$", 7C$_2$" of the conductor 7A, conductor 7B, conductor 7C$_1$, conductor 7C$_2$ are exposed in order to connect to the circuit element such as the capacitor 20. Out of them, an exposed portion 7A" corresponding to the conductor for power supply 7A is one in number, exposed portions 7B" corresponding to the conductor for ground 7B are two in number, and an exposed portions 7C$_1$", 7C$_2$" corresponding to sensor outputting conductors 7C$_1$, 7C$_2$ are one in number, respectively.

The conductor exposed portions are arranged in order of the conductor exposed portion for sensor outputting 7C$_1$", the conductor exposed portion for ground 7B", the conductor exposed portion for power supply 7A", the conductor exposed portion for ground 7B", and the conductor exposed portion for sensor outputting 7C$_2$".

The circuit element such as the capacitor 20 is connected between the conductor exposed portion for sensor outputting 7C$_1$" and the conductor exposed portion for ground 7B", between the conductor exposed portion for power supply 7A" and the conductor exposed portion for ground 7B", and between the conductor exposed portion for ground 7B" and the conductor exposed portion for sensor outputting 7C$_2$", respectively. The circuit element is inserted into the recess (hole) 15 provided between the conductor exposed portions.

According to the present embodiment, the effect similar to that of the first embodiment is obtained, and in addition, the rationalization of the external connection terminals and the wire harness subjected to insert-molding can be further achieved.

Next, a third embodiment of the present invention will be described with reference to FIGS. 17 to 21.

Figure 17A:
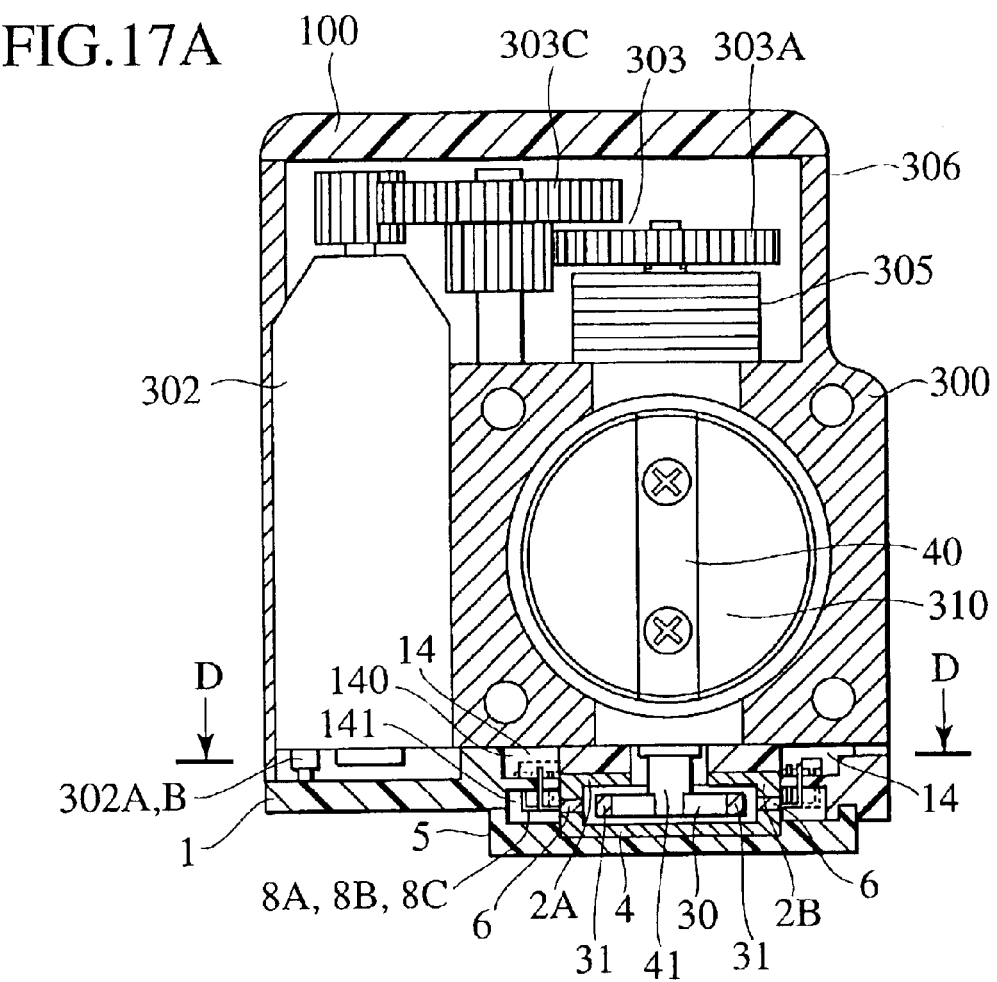
FIG. 17A is a sectional view of a throttle device in which a rotational position sensor (a throttle position sensor) according to a third embodiment of the present invention is mounted.
Figure 17B:
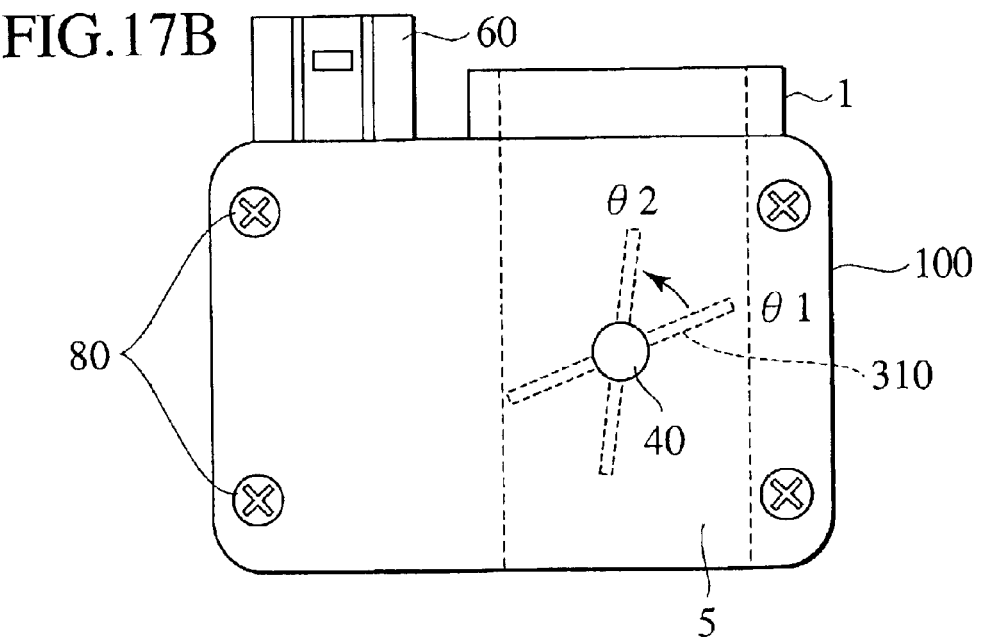
FIG. 17B is a side view thereof.
Figure 18:
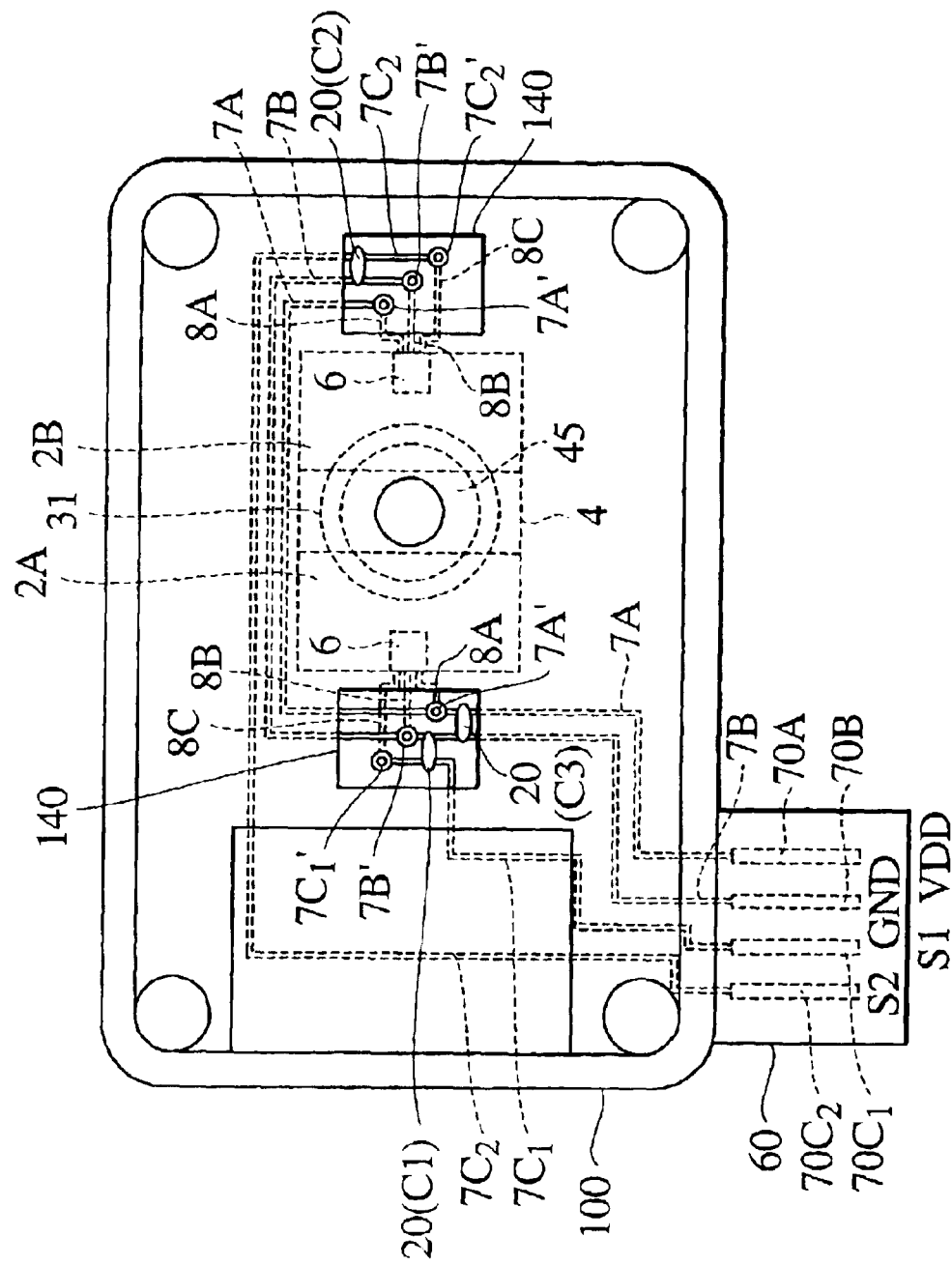
FIG. 18 is a plan view taken on line D—D of FIG. 16.

The rotational position sensor according to the present embodiment is also an example applied to the throttle position sensor similar to the second embodiment. FIG. 17A is a sectional view of the present embodiment, FIG. 17B is a side view thereof, FIG. 18 is a plan view as viewed from line D—D of FIG. 16, and FIGS. 19 to 22 are respectively partially enlarged sectional views showing main parts of the present embodiment with the forms thereof changed.

The throttle position sensor according to the present embodiment is also fundamentally similar in constitution to the second embodiment, except the following.

First, the sensor housing 1 is separated from the gear cover 100, and the independent sensor housing 1 can be mounted on the throttle body side opposite the gear cover 100.

Secondly, the difference is the joining construction between an external connection terminal 70A (a power supply terminal VDD), 70B (a ground terminal GND), 70C$_1$ (a sensor output terminal TPS1) and conductors 7A to 7C$_2$ of 70C$_2$ (a sensor output terminal TPS2), and input/output terminals 8A to 8C of the Hall IC 6, and the arranging construction of capacitors C1 to C3 or the like (a circuit element 20).

The housing 1 is secured air-tightly by means of a screw 80 to the throttle body 300. The cover 5 is secured air-tightly by means of adhesives or a screw to the housing 1. These mountings are similar also in the first and second embodiments.

The housing 1 and the lower stators 2A, 2B, and the cover 5 and the upper stator 4 are respectively integrated by insert-molding.

In FIGS. 2A and 2B, the housing 1 comprises a connector 60, a through-hole 45 for guiding one end of a throttle shaft 40, two Hall ICs 6, a space for joining a terminal of each Hall IC 6, lower stators 2A, 2B, and a circuit element 20 (capacitors C1, C2, C3).

Figure 19:
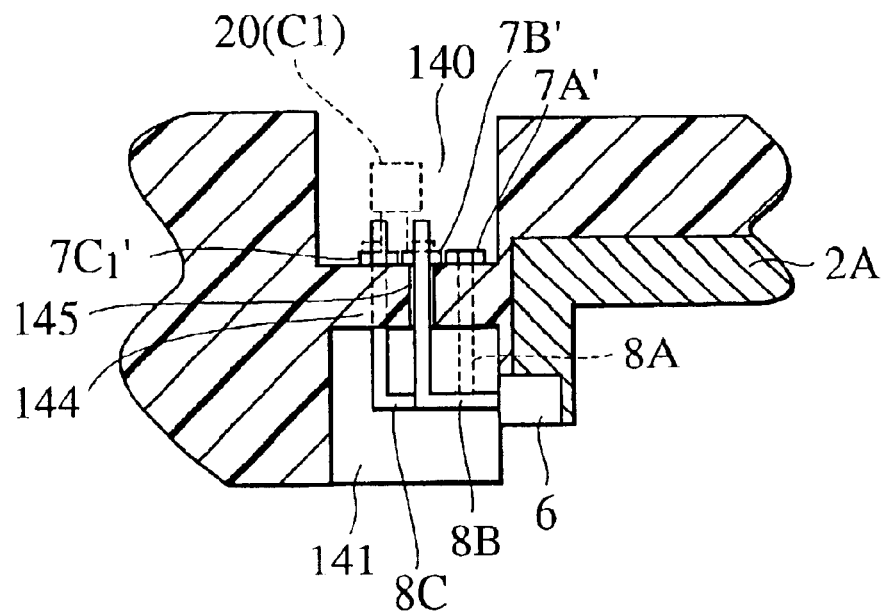
FIG. 19 is a partially enlarged sectional view showing essential parts of the present embodiment.

A terminal joining space 140 is defined in the vicinity of each Hall IC 6. This space 140 is formed from a recess formed in the housing 1. Further, the space 140 is formed on the surface opposite the side on which the Hall IC of the housing 1 is arranged, for example, as shown in FIG. 19. A space (a recess) 141 for guiding input/output terminals 8A to 8C of the Hall IC 6 is formed at a position opposite the space 140 of the housing 1.

A wall-thickness portion 144 of the housing 1 put between the spaces 140 and 141 becomes thin by a portion for securing the spaces, at which position are disposed guide holes 145 for guiding the input/output terminals 8A to 8C of the Hall IC 6.

The conductor 7A connected to the external output terminal 70A (power supply terminal VDD), the conductor 7B connected to the external output terminal 70B (ground terminal GND), the conductor 7C, connected to the external output terminal 70C$_1$ (sensor output terminal S1), and the conductor 7C$_2$, connected to the external output terminal 70 C$_2$ are embedded by insert-molding. One ends 7A', 7B', 7C$_1$' and 7C$_2$' of the conductors are positioned and exposed on the surface of the terminal joining space 140. The one ends of the conductors are at a position of a terminal guide hole (through-hole) 145. In the present embodiment, the conductors 7A, 7B are used in common by two Hall ICs 6, and one ends 7A', 7B' of the conductors guided to the space 140 on the left side in FIG. 18 are further extended and guided to the space 140 on the right side.

On the other hand, the VDD terminal 8A of the Hall IC 6, the GND terminal 8B, S1 and S2 terminal 8C are bended into an L-shape and molded, and these terminals are guided to the space 140 through the space 141 and the guide hole 145. And, at the position of the space 140, the one ends 7A', 7B', 7C$_1$' and 7C$_2$' of the conductors and the terminals 8A, 8B, 8C of the Hall IC are joined together by soldering or welding.

Further, in case of the present embodiment, as shown in FIG. 19, capacitors C1, C2, C3 (circuit element 20) of the surface mounting type are suitably connected between the conductors 7A and 7B, between the conductors 7C$_1$ and 7B, and between the conductors 7C$_2$ and 7B by soldering.

Figure 20:
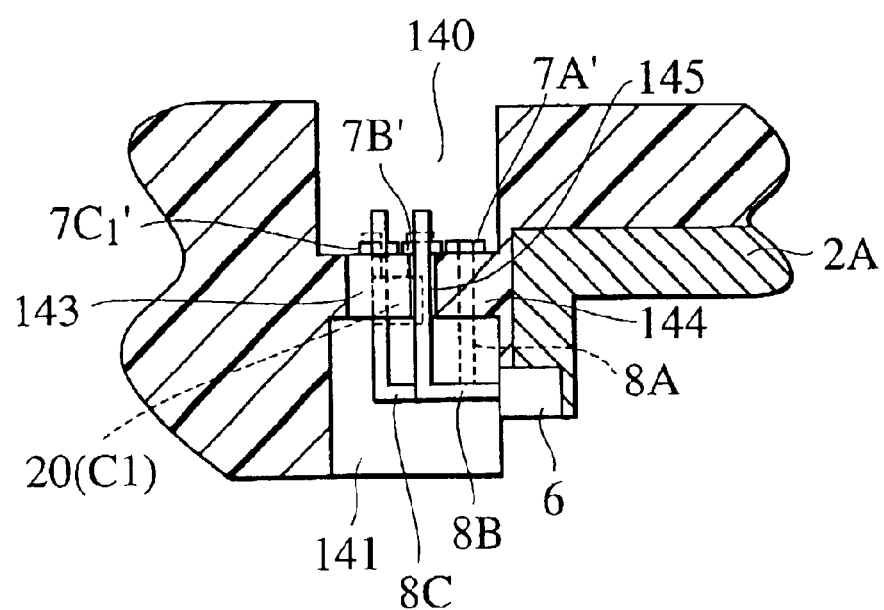
FIG. 20 is a partially enlarged sectional view showing essential parts of the other mode of the present embodiment.
Figure 21:
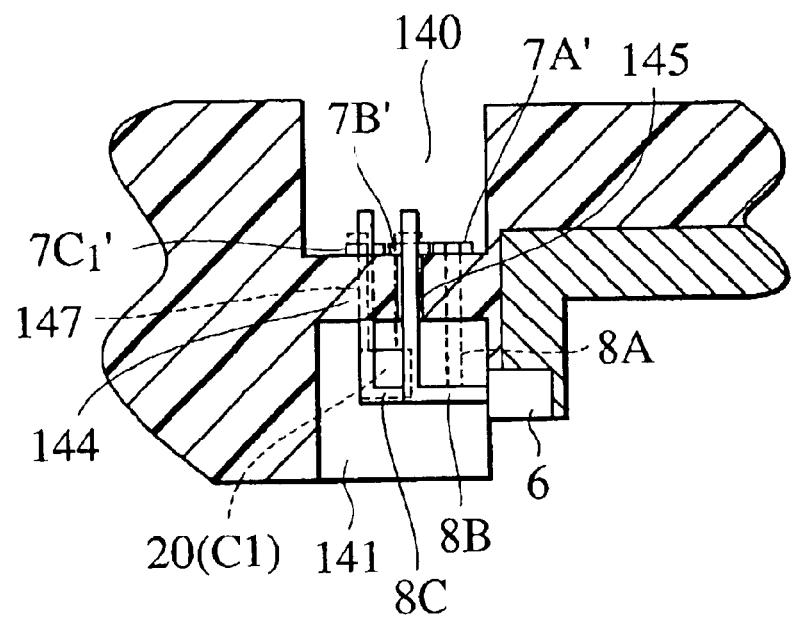
FIG. 21 is a partially enlarged sectional view showing essential parts of another mode of the present embodiment.
Figure 22:
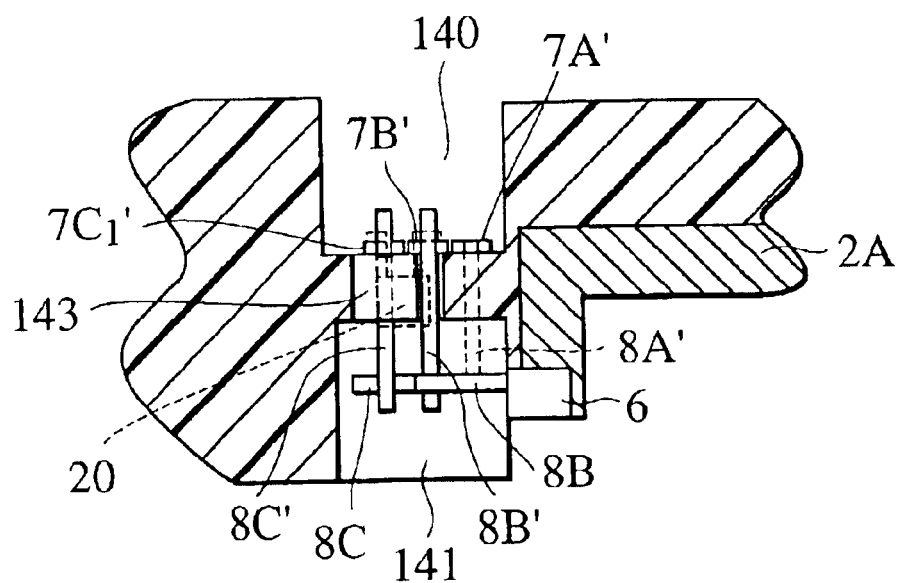
FIG. 22 is a partially enlarged sectional view showing essential parts of still another mode of the present embodiment.

It is noted that the circuit element 20 such as a capacitor can be connected in manners such as FIGS. 20, 21, and 22.

In FIG. 20, a hole 143 is formed in a thick-wall portion 144 facing to the terminal joining space 140 of the housing 1, lead type circuit elements (capacitors C1 to C3) are connected to the hole 143, and between the terminals 8A, 8B of the Hall IC, and between 8B, 8C downwardly in the figure.

In FIG. 21, the lead type circuit elements 20 (capacitors C1 to C3) are connected between the terminals 8A, 8B of the Hall IC, and between 8B, 8C downwardly in the guide space 141 (a storing space) of the Hall IC terminal. In this case, a through-hole portion 147 for inserting a lead portion of the circuit element 20 is provided in the housing 1.

Likewise, in FIG. 22, the circuit elements 20 (capacitors C1 to C3) of the lead type are stored, downwardly in the figure, into the hole 143, and the lead of the circuit element is connected between one ends 7A', 7B', between 7B', 7C$_1$', and 7B' and 7C$_2$'. The input/output terminals 8A to 8C of the Hall IC 6 are straight, which are connected to the intermediate terminals 8A' to 8C'. Further, the intermediate terminals 8A' to 8C' are connected to one ends 7A' to 7C$_2$'. In this case, the intermediate terminals 8A' to 8C' and the conductors 7A to 7C$_2$ may be constituted integrally.

Also in the present embodiment, the effect similar to that of the first and second embodiment can be obtained.

The present invention has the effect that in the rotational position sensor, protection of electric disturbance noises or surge to IC can be done with relatively simple constitution.

Further, it is possible to provide a non-contact type rotational position sensor which is allowed to achieve intensification of parts, miniaturization, simplification of assembly, and higher accuracy.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A non-contact type rotational position sensor comprising a rotor for a sensor mounted on a rotating body to be detected, and a sensitive element sensitive to physical energy generated from said rotor and changed according to a rotational position of said rotor, wherein a rotational position of said body to be detected is detected from an output of said sensitive element, comprising:

a housing made of synthetic resin for incorporating said rotor and said sensitive element, said housing being integrally provided with a connector provided with external connection terminals for connecting with external apparatuses;

conductors for connecting said external connection terminal to input/output terminals of said sensitive element, said conductors being embedded into said housing by insert-molding, one ends of said conductors being exposed onto the surface of the inner wall of the housing at a fixed position where the input/output terminals of said sensitive element are present; and a guide for guiding the input/output terminals of said sensitive element to said fixed position, said guide being formed in the inner wall of said housing, the input/output terminals of said sensitive element being guided by said guide and joined to the one ends of said conductors at said fixed position.

2. The rotational position sensor according to claim 1, wherein the one ends of said conductors are projected from or exposed to the surface of the inner wall of the housing, said guide is constituted by providing a groove or a hole in the inner wall of said housing, and the input/output terminals of said sensitive element are molded to have such a shape so as to be joined to the one ends of said conductors while being fitted in said guide.

3. The rotational position sensor according to claim 1, wherein said rotor is constituted by a ring-like magnet, a magnetic flux amount passing through said sensitive element changes according to the rotational position of the rotor,
   said sensitive element comprises a Hall element, said Hall element is integrated together with an amplification circuit by an IC chip,
   said rotor and said IC chip are put between an upper stator and a lower stator formed from magnetic plates opposedly arranged vertically,
   said lower stator is held by said housing, and said upper stator is held by a cover covering said housing, and
   a space for joining the input/output terminals of said IC chip to one ends of said conductors, and a groove-like or a hole-like guide for guiding the input/output terminals of said IC chip to said space, said IC chip being located by said guide, are provided on the peripheral inner wall at a location where the lower stator of said housing is installed.

4. The rotational position sensor according to claim 1, wherein said conductors embedded into said housing are used as a power supply input line, a ground line, and a sensor output line, said conductors are partly exposed to the surface of soul housing, and at least one kind of circuit element such as a capacitor, a Zener diode and a resistor is connected between said exposed conductors.

5. The rotational position sensor according to claim 1, wherein said conductors embedded into said housing are used as a power supply input line, a ground line, and a sensor output line, said conductors are partly exposed to the inner surface of said housing, at least one kind of circuit element such as a capacitor, a Zener diode and a resistor is connected between said exposed conductors, and a hole for encasing said circuit element is provided in the inner surface of the housing between said exposed conductors.

6. The rotational position sensor according to claim 1, wherein said conductors embedded into said housing are used as a power supply input line, a ground line, and a sensor output line, the joining position of said conductors and the input/output terminals of said sensitive element are a recess, and at least one kind of circuit element such as a capacitor, a Zener diode and a resistor is connected between said conductors of said recess or between said input/output terminals.

7. The rotational position sensor according to claim 1, wherein said rotational position sensor is used as an accelerator position sensor for detecting an accelerator pressing down position of an automobile or as a throttle valve position sensor for detecting a throttle valve opening degree.

8. The rotational position sensor according to claim 1, wherein said rotational positional sensor is a throttle valve position sensor, and the housing thereof is formed on a gear cover of a motor driven throttle body.

9. An electrically operated throttle device comprising a throttle valve for controlling flow rate of intake air of the internal combustion engine, a motor for driving a throttle shaft for supporting said throttle valve on the basis of a control signal to control a position of the throttle valve, a throttle body provided with said throttle valve internally thereof, a rotor for a throttle position sensor mounted on one end of said throttle shaft, and a sensitive element sensitive to physical energy generated from said rotor and changed according to a rotational position of said rotor, in which a position of said throttle valve is detected from an output of said sensitive element, comprising:
   a cover mounted on a side wall surface of said throttle body so as to cover one end of said throttle shaft, a housing wade of synthetic resin for incorporating said rotor and said sensitive element, and a connector provided with external connection terminals for connecting with external apparatuses being provided integral with said cover;
   conductors for connecting said external connection terminal to input/output terminals of said sensitive element, said conductors being embedded into said housing by insert-molding, one ends of slid conductors being exposed onto the surface of an inner wall of the housing at a fixed position where the input/output terminals of said sensitive element are present; and
   a guide for guiding the input/output terminals of said sensitive element to said fixed position, said guide being formed in the inner wall of said housing, the input/output terminals of said sensitive element being guided by said guide and joined to the one ends of said conductors at said fixed position.

10. An accelerator position sensor comprising a rotor for a sensor mounted on a rotational shaft of an accelerator pedal, and a sensitive element sensitive to physical energy generated from said rotor and changed according to a rotational position of said rotor, in which a pressing-down position of an accelerator pedal is detected from an output of said sensitive element, comprising:
    a housing made of synthetic resin for incorporating said rotor and said sensitive element, said housing being integrally provided with a connector provided with external connection terminals for connecting with external apparatuses;
    conductors for connecting said external connection terminal to input/output terminals of said sensitive element, said conductors being embedded into said housing by insert molding one ends of said conductors being exposed onto the surface of the inner wall of the housing at a fixed position where the input/output terminals of said sensitive element are present; and
    a guide for guiding the input/output terminals of said sensitive element to said fixed position, said guide being formed in the inner wall of said housing, the input/output terminals of said sensitive element being guided by said guide and joined to the one ends of said conductors at said fixed opposition.

11. The rotational position sensor according to claim 2, wherein said rotor is constituted by a ring-like magnet, a magnetic flux amount passing through said sensitive element changes according to the rotational position of the rotor,
    said sensitive element comprises a Hall element, said Hall element is integrated together with an amplification circuit by an IC chip,
    said rotor and said IC chip tire put between an upper stator and a lower stator formed from magnetic plates opposedly arranged vertically,
    said lower stator is held by said housing, and said upper stator is held by a cover covering said housing, and
    a space for joining the input/output terminals of said IC chip to one ends of said conductors, and a groove-like or a hole-like guide for guiding the input/output terminal of said IC chip to said space, said IC chip being located by said guide, are provide on a peripheral inner wall at a location where the lower stator of said housing is installed.

12. The rotational position sensor according to claim 2, wherein said conductors embedded into said housing are used as a power supply input line, a ground line, and a sensor output line, said conductors are partly exposed to the surface of said housing, and at least one kind of circuit element such as a capacitor, a Zener diode and a resistor is connected between said exposed conductors.

13. The rotational position sensor according to claim 11, wherein said conductors embedded into said housing are used as a power supply input line, a ground line, and a sensor output line, said conductors are partly exposed to the surface of said housing, and at least one kind of circuit element such as a capacitor, a Zener diode and a resistor is connected between said exposed conductors.

14. The rotational position sensor according to claim 2, wherein said conductors embedded into said housing are used as a power supply input line, a ground line, and a sensor output line, said conductors are partly exposed to the inner surface of said housing, at least one hind of circuit element such as a capacitor, a Zener diode and resistor is connected between said exposed conductors, and a hole for encasing said circuit element is provided in the inner surface of the housing between sad exposed conductors.

15. The rotational position sensor according to claim 11, wherein said conductors embedded into said housing are used as a power supply input line, a ground line, and a sensor output line, said conductors are partly exposed to the inner surface of said housing, at least one kind of circuit element such as a capacitor, a Zener diode and a resistor is connected between said exposed conductors, and a hole for encasing said circuit element is provided in the inner surface of the housing between said exposed conductors.

16. The rotational position sensor according to claim 2, wherein said conductors embedded into said housing are used as it power supply input line, a ground line, and a sensor output line, a joining position of said conductors and the input/output terminals of said sensitive element are a recess, and at least one kind of circuit element such as a capacitor, a Zener diode and a resistor is connected between said conductors of said recess or between said input/output terminals.

17. The rotational position sensor according to claim 11, wherein said conductors embedded into said housing are used us a power supply input line, a ground line, and a sensor output line, a joining position of said conductors and the input/output terminals of said sensitive element are a recess, and at least one kind of circuit element such as a capacitor, a Zener diode and a resistor is connected between said conductors of said recess or between said input/output terminals.

* * * * *